July 25, 1939.  O. E. PENSBEE  2,167,003
AUTOMATIC POWER CONTROL MEANS FOR VARIABLE SPEED PULLEYS
Filed Jan. 6, 1938
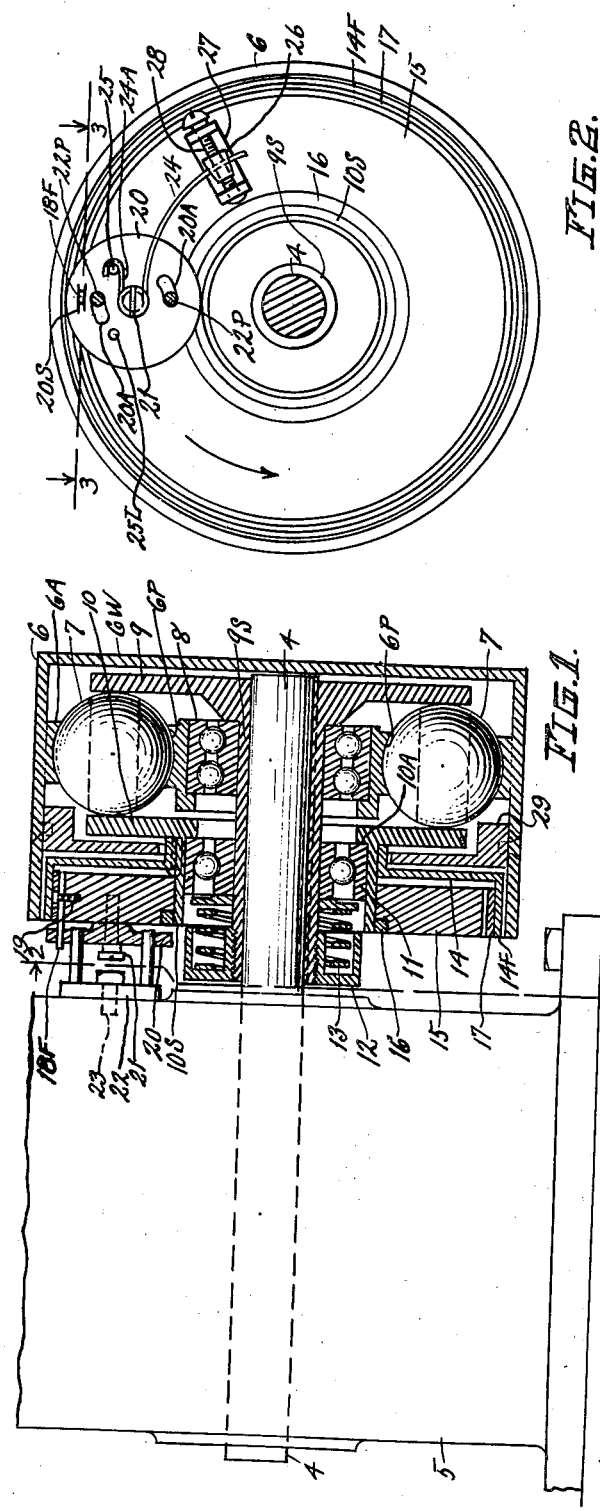
INVENTOR:
Otis Edward Pensbee
BY David E. Carlsen
ATTORNEY.

Patented July 25, 1939

2,167,003

UNITED STATES PATENT OFFICE 2,167,003

AUTOMATIC POWER CONTROL MEANS FOR VARIABLE SPEED PULLEYS

Otis Edward Pensbee, St. Paul, Minn.

Application January 6, 1938, Serial No. 183,662

4 Claims. (Cl. 74—302)

My invention relates to an automatic power input control device for variable speed pulleys of the type disclosed in my United States Patent No. 2,101,594, issued December 7, 1937.

This device embodies certain distinctive improvements over my said patent and combined therewith a new and unique construction which positively and automatically prevents overload of the motor, all of very simple and inexpensive construction as hereinafter described.

An object of the invention is to provide said automatic control means applicable to motors and pulleys rotating in either clockwise or counterclockwise direction by simple adjustment of certain parts. Further objects are hereinafter fully set forth in the following specification reference being had to the accompanying drawing, in which—

Fig. 1 is a longitudinal, diametrical section of my power control device as incorporated in a reduction speed pulley mounted on the drive shaft of an electric motor.

Fig. 2 is an inner end view of the device as seen from line 2—2 in Fig. 1 and looking toward the inner face of the pulley.

Fig. 3 is a partly sectional top view of Fig. 2, as on line 3—3 in Fig. 2 and revealing certain spring actuated means not clearly disclosed in the other views.

Referring to the drawing by reference numerals like characters designating corresponding parts in the various views, I have illustrated a single speed reduction pulley device comparable to my patented pulley above mentioned, a pulley 6 mounted on the exposed end of a drive shaft 4 of a motor 5 is made to drive the shaft in clockwise rotation as seen from outer end of said shaft.

6 designates the pulley which is closed at its outer end by a web or wall 6W, said pulley mounted concentrically of but not on the drive shaft, by means of an inner web 6A parallel to the end wall and having pockets 6P for rotatably retaining a number of circularly spaced balls 7 or equivalent thereof, said web 6A having a central bore for a ball bearing 8 which in turn is mounted on the sleeve 9S of an outer ball engaging cone 9 keyed on shaft 4. 10 is an inner normally non-rotating ball engaging cone member, both members 10 and 9 having upright circular flanges engaging opposite sides of the balls 7 frictionally.

Cone 9 being keyed to the drive shaft produces a rolling action of the balls 7 delivering or producing a pulley speed through web 6A of one-half the number of revolutions of the drive shaft.

As stated, the cone 10 is normally stationary but is capable of rotation said cone having a sleeve extension 10S mounted concentric of and on the drive shaft on another ball bearing 11 on said drive shaft and bearing inwardly against a shoulder 10A of the inner cone. 12 is a metal cap threaded on the end of the outer cone sleeve 9S adjacent the motor. Between said cap and the ball bearing I provide suitable spring means such as a compression coil spring 13 under constant compression and therefore through bearing 11 pressing cone 10 outwardly and thus providing pressure contact of the balls 7 from horizontally opposite sides.

On the hub or sleeve 10S of the inner cone 10 is fixed the hub part of a friction drum 14 with an integral perimetrical flange 14F extending toward the open end of the pulley and its free edge preferably in common plane with the inner rim of the pulley as shown, said flange being close to the inner face of the pulley and of course concentric thereof.

The main objective of said drum 14 is to hold the inner cone 10 rigidly in non-rotating contact with the balls 7 but means presently to be described, engaging said drum, are provided to gradually and automatically release said drum if and when an excess load is put on the pulley 6 and said non-rotating condition is automatically restored when overload ceases. These automatically acting means also provide for continued motor operation at specified speed thus reducing wear and tear on the motor or in other words the motor automatically works up to its capacity but is never subject to overload. The advantages of this automatic construction are therefore clearly apparent and said automatic means are as follows, subject to considerable variation within the scope of the device as shown:

15 is a vertically disposed, nonrotatable end plate, resembling a large washer and retained on the shank 10S of the cone member 10 by suitable means such as a retaining ring 16, the outer face of said plate flush with the open end of the pulley 6 and flange 14F, the outer rim of said plate of a diameter smaller than the inner diameter of said flange for retention therebetween of a normally expanded flat metal ring or band 17 normally engaging said flange.

Said band 17 is one piece and its adjacent ends are tapered to overlap (see Fig. 3) and the two extremities thereof pivotally retained each on a pin 18P of a rocking cam 18 pivoted at 19 (centrally and between pivots 18P) the latter comprising a pin fixed in plate 17 on the top part of its perimetrical edge. Said cam has an outwardly directed arm or finger 18F projecting horizontally (toward the motor) and engaged slidably in a slit 20S of a pivot plate 20 mounted to oscillate in a vertical plane on a set screw or pin 21 (or the like) retained in plate 15 and the plate 20 oscillatable in close parallel relation to the outer face of plate 15.

At diametrically opposite sides of pin 21, plate 20 is provided with a pair of arcuate slots 20A engaged simultaneously by a pair of fixed pins 22P of a bracket 22 fixed as at 23 to the side of the motor adjacent the pulley. The pin 21 is encircled by a coil of a two armed spring wire member 24 having a short arm 24A engaging a pin 25 to the right of the center of the plate 20 and its longer arm engaging slidably in a radially adjustable block 26 adjustable (in a bracket 27 fixed on the face of the plate 15) radially with relation to the motor shaft 4 by means of a threaded rod 28. Radial adjustment of the block 26 provides more or less spreading action of the arms of the spring 24, oscillating the plate 20 accordingly, moving the finger 18F of the cam to such position that the cam spreads the ends of the band 17 and the latter is in maximum expansion frictionally engaging the flange 14F of the drum 14 and preventing rotation of inner cone 10 until overloading of the pulley takes place, at which time the band is released.

Assuming now that a 5 H. P. motor of 1000 R. P. M. is used and that amount of power is available for belt drive by the pulley 6. Normally, and under the conditions stated the pulley will rotate 500 R. P. M., the inner cone 10 is stationary and held there by the band 17 in expanded contact with the flange 14F. Now if too much load is placed on pulley 6 the latter will of course slow up and the balls 7 will cause a reverse frictional action on the inner cam, or this may be called slippage because the outer cone will continue its regular rotation. This friction action will cause the inner cam to oscillate slightly in counterclockwise direction. Consequently flange 14F will move correspondingly, carrying the friction band 17 with it but said movement will cause plate 15 to move likewise and the cam finger 18F will be rocked thereby and immediately the ends of band member 17 are manipulated to contract the band. This movement and contraction may be very slight and gradual if overload of the pulley is gradual, but the immediate effect of the contraction of the band is that drum 14 is gradually freed and will rotate in proportion to amount of overload. In other words contact of inner cone 10 against the driving balls is diminished, the pulley rotation will likewise diminish, but the outer cone 9 will continue rotation at the given motor speed. Thus it will be seen that resistance because of overload of the pulley will not be transmitted to the motor but is automatically transmitted to the inner cone which automatically causes proportionate freedom of rotation of the inner cone. As the overload condition is removed the spring actuated parts return to normal driving condition.

The use of my automatic load control device has been fully disclosed simultaneously with the above description of construction.

29 (Fig. 1) is a metal partition fixed in the pulley and in position between the inner cone 10 and the adjacent wall of the drum 14 and functioning as a lubricant retainer for any kind of lubricant used for the rotary parts within the pulley.

I claim:

1. In an automatic power input control device of the class described for reduction speed pulleys having speed reduction means within the pulley and the latter mounted on a motor drive shaft, said speed reduction means comprising a circular row of balls rotatable in pockets of a diametrical web of the pulley, a drive cone on the motor shaft engaging the outer parts of said balls and an inner normally stationary cone engaging the inner parts of said balls, a flanged drum carried by said inner cone, an expansible and contractible band normally engaging said flanged drum frictionally and means for automatically disengaging said band from the drum when the load on the pulley exceeds a predetermined amount.

2. The structure specified in claim 1, and spring means longitudinal of the motor shaft acting on the inner cone for certain frictional contact of the latter with the said ball means and simultaneously providing ball squeezing action between said cones.

3. The structure specified in claim 1 in which said inner cone and said drum are integral and concentric of the motor shaft and capable of a limited oscillating movement, a circular plate inclosing the inner end part of the pulley and having a circular rim inwardly of the friction drum flange, said band of one piece and having its adjacent ends overlapped, a finger cam pivoted on the rim of said plate and having pivotal connection with both said band ends, and the finger of said cam projecting outwardly and yieldable spring actuated means engaging said finger to normally positioning the cam to spread the ends of the band for the latter to normally frictionally engage the drum.

4. The structure specified in claim 1, in which said inner cone and said drum are integral and concentric of the motor shaft and capable of a limited oscillating movement, a circular plate inclosing the inner end part of the pulley and having a circular rim inwardly of the friction drum flange, said band of one piece and having its adjacent ends overlapped, a finger cam pivoted on the rim of said plate and having pivotal connection with both said band ends, and the finger of said cam projecting outwardly and yieldable spring actuated means engaging said finger to normally position the cam to spread the ends of the band for the latter to normally frictionally engage the drum, said latter means including an oscillatable plate pivotally mounted on the outer wall of said circular plate, said oscillatable plate provided with a slit engaging said protruding cam finger, and spring actuated means yieldably engaging said plate to bear in either direction and spread the drum engaging band.

OTIS EDWARD PENSBEE.